Patented Sept. 11, 1945

2,384,547

UNITED STATES PATENT OFFICE 2,384,547

BUTADIENE COPOLYMERS

Charles F. Fryling, Akron, Ohio, assignor to The B. F. Goodrich Company, New York, N. Y., a corporation of New York No Drawing. Application September 1, 1942, Serial No. 456,924

6 Claims. (Cl. 138—55)

This invention relates to the polymerization of a mixture of butadiene-1,3, acrylonitrile and styrene in certain definite proportions and to the improved rubbery copolymers thereby obtained.

It is well known that butadiene-1,3 (referred to hereinafter by its common name of butadiene) may be copolymerized with lesser amounts of acrylonitrile or with lesser amounts of styrene to form rubbery materials known as synthetic rubbers. It is also well known that the synthetic rubber prepared from butadiene and acrylonitrile is insoluble in and not even swelled by prolonged contact with aliphatic hydrocarbon solvent such as gasoline and mineral oils but is appreciably swelled by aromatic hydrocarbon solvents such as benzene, toluene and naphthylene; and that the synthetic rubber prepared from butadiene and styrene is, like natural rubber, swelled to such an extent that its structure breaks down when in prolonged contact with either aliphatic or aromatic hydrocarbon solvents.

For many purposes, however, a synthetic rubber which will swell to a limited extent, but not to such an extent that its structure is degraded, when in contact with either aliphatic or aromatic hydrocarbons is desired. For example such a rubbery material would be particularly suited for use in the manufacture of self-sealing hose adapted to deliver motor fuel which may be composed either of aliphatic hydrocarbons alone or of aliphatic hydrocarbons in admixture with appreciable proportions of aromatic hydrocarbons, for in service the rubbery material in contact with the motor fuel would swell to an extent sufficient to compress it so that sealing would automatically occur when the hose was pierced yet it would not swell to an extent sufficient to close the diameter of the hose or to weaken the hose structure.

Heretofore no single rubbery material has been known which possesses this peculiar combination of properties. As mentioned hereinabove the rubbery butadiene-acrylonitrile copolymers possess about the proper degree of swelling in fuels containing aromatic hydrocarbons but they swell scarcely at all in fuels composed entirely of aliphatic hydrocarbons. The rubbery butadiene-styrene copolymers on the other hand, as well as natural rubber and other butadiene copolymers, swell severely and dissolve in either type of motor fuel. Furthermore, many of the rubbery materials prepared by the polymerization of mixtures of butadiene, acrylonitrile and styrene do not possess the desired combination of swelling properties for it has been observed that the polymers prepared from mixtures containing smaller amounts of styrene than of acrylonitrile are not swelled by aliphatic hydrocarbon while the polymers prepared from mixtures containing larger amounts of styrene than of acrylonitrile swell severely in either aromatic or aliphatic hydrocarbons.

I have now discovered that rubbery polymers prepared by the polymerization of mixtures of butadiene, styrene and acrylonitrile in which the proportions of butadiene is from 65 to 80% by weight of the mixture and the remaining 20 to 35% of the mixture consists of substantially equal proportions of styrene and acrylonitrile, are swelled to a limited extent in both aromatic and aliphatic hydrocarbons yet are neither severely swelled by nor are appreciably soluble in either. Moreover these polymers possess other extremely valuable properties, not present to the same extent in polymers prepared from 65–80% butadiene and 20–35% acrylonitrile, such as excellent plasticity and extruding properties and the property of remaining flexible at very low temperatures, all of which properties make them especially useful for the construction of self-sealing gasoline hose and for other purposes.

It is quite surprising that these butadiene-acrylonitrile-styrene copolymers should possess these unique properties since it might be expected that the inclusion of styrene, an aromatic material, in a mixture of butadiene and acrylonitrile would yield a polymer which would be swelled more in aromatic hydrocarbons than the polymer prepared from butadiene and acrylonitrile alone; yet actually the swelling of the three-component polymer in aromatic hydrocarbons remains substantially the same as that of the butadiene-acrylonitrile copolymer while the swelling in aliphatic hydrocarbons is increased. It is also surprising that these polymers prepared from mixtures containing 65–80% butadiene and 20–35% of substantially equal proportions of acrylonitrile and styrene should be flexible at lower temperatures than those prepared from 65–80% butadiene and 20–35% acrylonitrile alone, since the use of styrene to replace a portion of the acrylonitrile in mixtures containing other proportions of butadiene does not affect the low temperature flexibility of the polymeric product.

As is set forth hereinabove the improved rubbery polymers of this invention are prepared by the polymerization of a mixture of monomeric materials consisting of from about 65 to 80% by weight of butadiene and from about 20 to 35% by weight of substantially equal proportions of acrylonitrile and styrene. For the best results the exact amount of styrene as acrylonitrile should be employed, as for example, in mixtures of butadiene-acrylonitrile-styrene in the following respective proportions: 70—15—15, 75—12.5—12.5, 80—10—10, 68—16—16, 65—17.5—17.5. However, it is also possible to vary the proportion of styrene to acrylonitrile by a few percent, but not more than about 5%, without sacrificing the advantages of the invention. Thus mixtures of butadiene, acrylonitrile and styrene in respective proportions as 75—15—10, 75—10—15, 70—16—14, 80—11—9, 66—18—16, 65—20—15, and 65—15—20 are considered, for the purposes of this invention, to contain substantially the same amount of styrene as acrylonitrile.

The method of effecting the polymerization of these mixtures is preferably in an aqueous emulsion in the manner well known to the art since quantitative yields of polymers may be obtained in a short time. However, other methods of polymerization in which the various compounds of the mixture enter into the polymeric product in substantially the same ratio as they are present in the monomeric mixture may also be employed.

When the polymerization is conducted in an aqueous emulsion the monomeric materials are emulsified in an aqueous solution of an emulsifying agent such as a fatty acid soap, a hymolal aryl sulfonate, a salt of a high molecular weight aliphatic base, a high molecular weight aliphatic sulfate or sulfonate or some other suitable emulsifying agent; one or more polymerization initiators, which enable the polymerization to begin rapidly; polymerization catalysts or accelerators, which speed up the polymerization reaction; polymerization modifiers or regulators, which direct the course of the polymerization in a manner which produces a plastic, linear, non-cross-linked polymer; or other substances which otherwise improve the polymerization, are then preferably added to the emulsion and the emulsion is allowed to polymerize as by agitating it at a temperature of about 20–80° C. for about 10 to 100 hours. The product is obtained in the form of a latex-like dispersion which is preferably stabilized by the addition of an age-resistor such as phenyl-beta-naphthylamine and is then coagulated in the ordinary way to yield the solid rubbery material.

Exemplary polymerization initiators which may be used in the above process include peroxygen compounds such as hydrogen peroxide, potassium persulfate, sodium perborate, potassium percarbonate, sodium periodate, peroxynitric acid and the like as well as other types of initiators such as diazoamino benzene and dipotassium diazomethane disulfonate. Exemplary polymerization catalysts or accelerators include simple and complex compounds of heavy metals such as cobalt chloride, ferrous ammonium sulfate, sodium cobaltinitrite, sodium ferripyrophosphate and the like, either alone, in combination with one another or in combination with other compounds such as pyrophosphates, organic acids, sugars, certain organic sulfur compounds, sterols, and the like as well as metal-free catalysts such as dicyandiamidine sulfate, thiobarbituric acid, ascorbic acid, thiamine chloride and the like. Typical polymerization modifiers are organic sulfur-containing compounds such as dialkyl dixanthogens, thiuram disulfides, aliphatic mercaptans, thiazoles, dithiocarbamates and the like.

Other methods and procedures known to be useful in connection with the polymerization of monomer mixtures containing butadiene may also be applied to the polymerization of the butadiene-acrylonitrile-styrene mixtures of this invention.

As an example of the preparation of an improved rubbery butadiene copolymer according to this invention, a monomeric mixture consisting of 70 parts by weight of butadiene, 15 parts by weight of acrylonitrile and 15 parts by weight of styrene is emulsified in 250 parts of a 2% aqueous solution of a fatty acid soap. About 1.0 part of a 3% aqueous solution of hydrogen peroxide, 0.03 part of ferrous ammonium sulfate, 0.0015 part of cobalt chloride, 0.2 part of sodium pyrophosphate and 0.6 part of diisopropyl dixanthogen are then added to the emulsion and the emulsion is agitated in a closed container for about 25 hours at a temperature of 30° C. At the end of this time the polymerization is complete and a latex-like dispersion is obtained. An emulsion containing 3 parts of phenyl-beta-naphthylamine is then added to the synthetic latex and the latex is coagulated whereupon a quantitative yield of a rubbery butadiene-acrylonitrile-styrene (70—15—15) copolymer is obtained.

This rubbery copolymer is quite plastic and may easily be milled, mixed with conventional compounding ingredients for rubbery materials, extruded, molded and otherwise formed into any desired shape and vulcanized. In plasticity, milling behavior and ability to be molded and extruded it is far superior to a copolymer prepared in a similar manner from 70 parts butadiene and 30 parts acrylonitrile. For example, the Goodrich plasticity of this butadiene-acrylonitrile-styrene copolymer at 100° C. using a 10# weight is 58 while that of the butadiene-acrylonitrile copolymer is only 9. Similarly, this three-component copolymer may be milled readily on a hot or cold mill and "breaks down" after being milled only three minutes whereas the butadiene-acrylonitrile copolymer is difficult to mill on a hot mill and requires about 8 minutes milling before "break down" on a cold mill.

The swelling properties of this butadiene-acrylonitrile-styrene copolymer and of its vulcanizates are quite remarkable. When in contact with common motor fuels consisting of aliphatic hydrocarbons or of mixtures of aromatic and aliphatic hydrocarbons limited swelling, to the extent of about 25 to 100% by volume, occurs but this swelling is not appreciably increased by prolonged contact with these materials and solubility of the copolymer in the motor fuels does not occur. In its swelling behavior in aromatic hydrocarbons it resembles butadiene-acrylonitrile copolymers whereas its limited swelling in aliphatic hydrocarbon such as hexane is much more than the swelling of butadiene-acrylonitrile copolymers in these materials.

This butadiene-acrylonitrile-styrene copolymer also remains soft and flexible either in the unvulcanized or vulcanized condition when exposed to temperatures as low as −40 to −60° C. whereas a copolymer prepared from butadient 70 and acrylonitrile 30 becomes stiff and inflexible at about −30° C.

The peculiar combination of working properties, swelling properties and low temperature flexibility possessed by the copolymer prepared above, as well as other similar copolymers prepared by the polymerization of mixtures of 65–80% by weight of butadiene and 20–35% by weight of a mixture of substantially equal proportions of acrylonitrile and styrene, renders these rubbery materials particularly adapted for use in the manufacture of bullet-sealing gasoline hose for aircraft and the like. Thus, a hose having its inner surfaces constructed of a rubbery vulcanizate of the copolymer described above, and provided, if desired, with a protective cover of fabric or a fabric-reinforced rubbery material is self-sealing because of the fact that, in service, the swelling of the resilient copolymer vulcanizate produces compression herein sufficient quickly to seal the hole left by a bullet or similar projectile. On the other hand the swelling which occurs is not sufficient to plug the hose or to weaken its structure and the fuel passing through the hose does not dissolve a sufficient quantity of the copolymer to clog carburetors or to produce any other disastrous results. Moreover, the low temperature flexibility of the copolymer used in constructing the hose enables it to be used under severe atmospheric conditions. When other known copolymers such as a copolymer of butadiene and acrylonitrile or a copolymer of butadiene and styrene are employed in this manner in the construction of a hose, however, all these desirable results are not achieved.

Although the copolymers of this invention have been described with particular reference to their use in the manufacture of self-sealing hose, it is to be understood that the invention is not intended to be limited to this preferred application for obviously these new synthetic rubbers may also be employed in the manufacture of bullet-sealing gasoline tanks, tires, tubes, belts and in many other of the multifarious uses to which rubber and synthetic rubbery materials ordinarily are put.

Obviously, many modifications and variations not specifically described herein but which will occur to those skilled in the art are within the spirit and scope of the appended claims.

I claim:

1. A rubbery material prepared by the polymerization of a mixture of butadiene-1,3, acrylonitrile and styrene, said mixture consisting of from 65 to 80% by weight of butadiene-1,3 and from 20 to 35% by weight of substantially equal proportions of acrylonitrile and styrene.

2. A rubbery material prepared by the polymerization of a mixture of 70% by weight of butadiene-1,3, 15% by weight of styrene and 15% by weight of acrylonitrile.

3. The process which comprises polymerizing a mixture of butadiene-1,3, acrylonitrile and styrene, said mixture consisting of from 65 to 80% by weight of butadiene-1,3 and from 20 to 35% by weight of substantially equal proportions of acrylonitrile and styrene.

4. The process which comprises polymerizing in aqueous emulsion a mixture of 70% by weight of butadiene-1,3, 15% by weight of styrene and 15% by weight of acrylonitrile.

5. A self-sealing fuel hose for aircraft and the like, said hose comprising in the inside portions adapted to come in contact with the fuel and to swell from 25 to 100% by volume therein, a rubbery material prepared by the polymerization of a mixture of butadiene-1,3, acrylonitrile, and styrene, said mixture consisting of from 65 to 80% by weight of butadiene-1,3 and from 20 to 35% by weight of substantially equal proportions of acrylonitrile and styrene.

6. A self-sealing fuel hose for aircraft and the like, said hose comprising an outer covering portion and an inner portion adapted to come in contact with the fuel and to swell from 25 to 100% by volume therein, said inner portion comprising a vulcanized rubbery material prepared by the polymerization of a mixture of about 70% by weight of butadiene-1,3, about 15% by weight of acrylonitrile and about 15% by weight of styrene.

CHARLES F. FRYLING.